(12) United States Patent
Zheng

(10) Patent No.: US 12,721,425 B1
(45) Date of Patent: Sep. 1, 2026

(54) VERTICAL RECIPROCATING ELECTRIC BRUSH FOR POWERFUL STAIN REMOVAL

(71) Applicant: Xu Zheng, Rui'An (CN)

(72) Inventor: Xu Zheng, Rui'An (CN)

( * ) Notice: Subject to any disclaimer, the term of this patent is extended or adjusted under 35 U.S.C. 154(b) by 0 days.

(21) Appl. No.: 19/563,164

(22) Filed: Mar. 11, 2026

(30) Foreign Application Priority Data

Oct. 21, 2025 (CN) ......................... 202522221247.2

(51) Int. Cl.
*A46B 13/02* (2006.01)
*A46B 5/02* (2006.01)
*A46B 15/00* (2006.01)
*F16H 21/22* (2006.01)
*F16H 57/02* (2012.01)

(52) U.S. Cl.
CPC ................ *A46B 13/02* (2013.01); *A46B 5/02* (2013.01); *A46B 15/0006* (2013.01); *F16H 21/22* (2013.01); *F16H 57/02* (2013.01); *A46B 2200/30* (2013.01); *F16H 2057/02034* (2013.01); *F16H 2057/02069* (2013.01)

(58) Field of Classification Search
CPC ......... A46B 13/02; A46B 13/023; A46B 5/02; A46B 15/0006; A46B 2200/30; F16H 21/22; F16H 57/02; F16H 2057/02034; F16H 2057/02069; A61C 17/3445
See application file for complete search history.

(56) References Cited

U.S. PATENT DOCUMENTS 1,869,991 A * 8/1932 White ................ A61C 17/3472 15/22.4
3,160,902 A * 12/1964 Julian ................ A61C 17/3472 74/49
2011/0308024 A1* 12/2011 Hegemann ........... A46B 5/0012 15/22.1

* cited by examiner

*Primary Examiner* — Andrew A Horton
(74) *Attorney, Agent, or Firm* — HOWARD M COHN and Associates, LLC

(57) ABSTRACT

A vertical reciprocating electric brush for stain removal, as proposed by the present disclosure, mainly includes an electric brush handle, a brush head arranged on its front side, and a linear drive mechanism inside. A linear sliding pair (or specifically a plunger sliding pair) is arranged between the linear drive mechanism and the brush head, to transmit a linear reciprocating motion output by the linear drive mechanism to the brush head. The linear drive mechanism includes a rotating motor and a crank-connecting rod mechanism, which can convert the rotational motion of the motor into linear motion of a slider. Through this structure, pressure can be applied to the brush handle during use, causing the brush head to form an efficient vertical reciprocating scrubbing motion on the work surface.

16 Claims, 11 Drawing Sheets

VERTICAL RECIPROCATING ELECTRIC BRUSH FOR POWERFUL STAIN REMOVAL

TECHNICAL FIELD

The present disclosure relates to the technical field of electric cleaning tools, and particularly to a handheld vertical reciprocating electric brush for scenarios such as household, industrial, or automotive cleaning.

BACKGROUND

In the related art, existing handheld electric cleaning brushes are mainly arranged with rotating brush heads. The rotational motion pattern of the rotating brush head leads to dispersed cleaning force, making it difficult to effectively remove stubborn stains, and easily causing splashing of dirty liquid. In addition, vibration and noise brought by high-speed rotation are significant, resulting in poor operational feel and easy fatigue. Furthermore, the internal structure is simple, lacking precise guidance and rigid support for transmission components, thereby leading to easy wear during long-term use and poor stability.

SUMMARY OF THE DISCLOSURE

Aiming at the deficiencies of the related art, the present disclosure provides an electric brush with a reciprocating brush head, having powerful stain removal capability.

The technical solution is as follows.

A vertical reciprocating electric brush for powerful stain removal, including:

- an electric brush handle, wherein a linear drive mechanism is arranged within the electric brush handle;
- a powerful brush head, arranged on a front side of the electric brush handle; and
- a linear sliding pair, arranged between the linear drive mechanism and the powerful brush head, for transmitting a linear reciprocating motion output by the linear drive mechanism to the powerful brush head;
- wherein in a state where appropriate pressure is applied on the electric brush handle, the powerful brush head acts on an object to be cleaned, forming a vertical reciprocating scrubbing motion.

In some embodiments, the linear sliding pair includes:

- a linear slide rail, fixed to a front part of the electric brush handle; wherein a linear direction of the linear slide rail is parallel to a connection axis between the powerful brush head and the electric brush handle; and
- a linear slider, capable of sliding linearly relative to the linear slide rail; wherein a front end of the linear slider is connected to a tail of the powerful brush head, and a rear end of the linear slider is connected to an output end of the linear drive mechanism.

In some embodiments, the linear drive mechanism includes:

- a rotating motor, fixed inside a housing of the electric brush handle, for providing mechanical energy to the powerful brush head;
- wherein a rotation axis of the rotating motor is perpendicular to a sliding direction of the linear sliding pair, and a rotational torque of the rotating motor is configured to be output to the powerful brush head through a push-pull force of the linear slider.

In some embodiments, the linear drive mechanism further includes:

- a crank-connecting rod mechanism, connected between a rotating shaft of the rotating motor and the linear slider of the linear sliding pair, for converting a rotational motion of the rotating motor into a linear motion of the linear slider.

In some embodiments, the crank-connecting rod mechanism includes:

- a crankshaft, connected to the rotating motor, for converting an in-situ rotation of the rotating motor into an eccentric rotation; and
- a connecting rod, for converting an eccentric rotation of the crankshaft into a reciprocating linear motion of the linear slider.

In some embodiments, the linear sliding pair is a plunger sliding pair;

- the linear slide rail is a plunger sleeve arranged on the front part of the electric brush handle;
- the linear slider is a plunger rod slidingly fitted inside the plunger sleeve.

In some embodiments, the rotation axis of the rotating motor orthogonally intersects an axis of the plunger rod;

- a sliding stroke of the plunger rod relative to the plunger sleeve equals twice an eccentricity of the crankshaft.

In some embodiments, a drive bracket is arranged inside the electric brush handle;

- a rear segment of the plunger sleeve is arranged in an inner cavity of a plunger mounting seat located on a front part of the drive bracket, with an opening of the plunger mounting seat facing forward;
- a front end face of the rotating motor is arranged on a reference surface of a motor mounting seat located on a rear part of the drive bracket;
- wherein an axis of the plunger mounting seat is parallel to the reference surface of the motor mounting seat, ensuring that the rotation axis of the drive motor is perpendicular to a sliding direction of the plunger rod.

In some embodiments, a flexible damping sleeve is sleeved on an outside of the plunger sleeve, for reducing vibration transmission between the plunger sliding pair and the electric brush handle.

In some embodiments, an outer diameter of the flexible damping sleeve has a stepped structure with a thicker rear segment and a thinner front segment; a rear damping segment of the flexible damping sleeve is configured to attenuate vibration between the plunger sliding pair and the plunger mounting seat, and a front damping segment of the flexible damping sleeve is configured to attenuate vibration between the plunger sliding pair and a front end cover of the electric brush handle.

In some embodiments, the crankshaft includes:

- a center wheel, defining a central shaft hole opened along an axis of the center wheel for sleeving onto the rotating shaft of the rotating motor, and a locking screw hole opened radially for fastening the rotating shaft of the rotating motor;
- an inertia wheel, coaxial and integrated with the center wheel, for increasing a rotational inertia of the rotating motor to stabilize a speed of the rotating motor; wherein the inertia wheel is capable of reducing a rated power of the rotating motor while ensuring a maximum load of the powerful brush head; and an eccentric shaft, extending from a side of the inertia wheel opposite the center wheel, with an axis of the eccentric shaft being parallel to an axis of the inertia wheel, for transmitting a rotational mechanical energy from the rotating motor to the connecting rod to convert the rotational mechanical energy into linear reciprocating mechanical energy.

In some embodiments, a tail of the plunger rod is connected to a small end of the connecting rod via a front rolling bearing;

an axis of the front rolling bearing is perpendicular to the axis of the plunger rod;

the eccentric shaft of the crankshaft is connected to a large end of the connecting rod via a rear rolling bearing;

a rotation axis of the front rolling bearing and a rotation axis of the rear rolling bearing are precisely parallel, for facilitating reduction of motion resistance of the crank-connecting rod mechanism.

In some embodiments, a space enclosed by a back surface of the motor mounting seat, a side wall, of which an edge extends backward, of the motor mounting seat, and a bottom wall of the plunger mounting seat constitutes a transmission cavity for accommodating the crank-connecting rod mechanism;

the tail of the plunger rod passes through a plunger rear hole on the bottom wall of the plunger mounting seat, and the rotating shaft of the rotating motor passes through a shaft hole of the motor mounting seat; the tail of the plunger rod and the rotating shaft of the rotating motor are connected to the crank-connecting rod mechanism respectively within the transmission cavity.

In some embodiments, a connection between the crankshaft and the rotating motor is a cantilever structure, and the transmission cavity is a simplified half-box open configuration, for reducing a manufacturing cost of the crankshaft and a crank-connecting rod housing.

In some embodiments, a connection between the connecting rod and the plunger rod is a cantilever structure;

the tail of the plunger rod is arranged with a connecting rod mounting surface parallel to the sliding direction;

the connecting rod mounting surface is arranged with a screw pin shaft perpendicular to the sliding direction;

the screw pin shaft orthogonally intersects the axis of the plunger rod.

In some embodiments, the large end of the connecting rod is arranged on the eccentric shaft of the crankshaft via the rear rolling bearing and a bolt pin;

the small end of the connecting rod is arranged on the screw pin shaft on the tail of the plunger rod via the front rolling bearing and another bolt pin.

In some embodiments, a rear bearing hole on the large end of the connecting rod is arranged with a rear step for axially positioning an outer ring of the rear rolling bearing;

a front bearing hole on the small end of the connecting rod is arranged with a front step for axially positioning an outer ring of the front rolling bearing;

wherein, axial positions of the front rolling bearing and the rear rolling bearing, respectively defined by the front step and the rear step, and an axial dimension of the crankshaft on the rotating motor are adapted to a distance between the connecting rod mounting surface of the plunger rod and the reference surface of the motor mounting seat.

In some embodiments, a front end cover of the electric brush handle defines a plunger front hole on its center;

the front damping segment of the flexible damping sleeve passes into the plunger front hole, for reducing vibration transmission between the plunger sliding pair and the front end cover;

a head of the plunger rod passes through the plunger sleeve and is connected to a tail rod of the powerful brush head, for transmitting kinetic energy from the linear drive mechanism to the powerful brush head.

In some embodiments, the tail rod is substantially parallel to a scrubbing surface of the powerful brush head and located above it, enabling the scrubbing surface to perform vertical reciprocating motion in its own plane via the tail rod following the plunger rod.

In some embodiments, a circular inner wall of the plunger mounting seat is arranged with several peripherally spaced axial ribs;

an outer cylindrical surface of the rear damping segment of the flexible damping sleeve forms a tight fit with the axial ribs, mounting the plunger sliding pair inside the plunger mounting seat.

A vertical reciprocating electric brush for powerful stain removal, including:

an electric brush handle, wherein a linear drive mechanism is arranged within the electric brush handle;

a powerful brush head, arranged on a front side of the electric brush handle;

a plunger sliding pair, arranged between the linear drive mechanism and the powerful brush head, for transmitting a linear reciprocating motion output by the linear drive mechanism to the powerful brush head; and a control circuit, for supplying power to and controlling the linear drive mechanism;

wherein in a case where the control circuit drives the powerful brush head to move longitudinally via the linear drive mechanism, the powerful brush head acts on an object to be cleaned, forming a front-to-back reciprocating scrubbing.

In some embodiments, the plunger sliding pair includes:

a plunger sleeve, arranged in a plunger mounting seat on a front part of the electric brush handle, and a plunger rod slidingly fitted with the plunger sleeve;

wherein the plunger rod is connected between the powerful brush head and the linear drive mechanism.

In some embodiments, the linear drive mechanism includes:

a rotating motor, fixed on a reference surface of a motor mounting seat inside a housing of the electric brush handle; and a crank-connecting rod mechanism, connected between a rotating shaft of the rotating motor and the plunger sleeve of the plunger sliding pair, for converting a rotational motion of the rotating motor into a linear motion of the plunger rod; wherein a rotational torque of the rotating motor is configured to be output to the powerful brush head through a push-pull force of the plunger rod.

Beneficial technical effects of using the technical solution of the present disclosure are as follows.

Cleaning efficiency is significantly improved. Through the linear drive mechanism and linear sliding pair, the brush head is driven to perform vertical reciprocating motion, generating concentrated scrubbing force perpendicular to the cleaning surface, effectively acting on stubborn stains, and avoiding the splashing problem caused by rotary brush heads.

Stable operation, low vibration and noise. The rotation axis of the rotating motor is set perpendicular to the reciprocating motion direction, and the conversion from rotational motion to reciprocating linear motion is achieved via the crank-connecting rod mechanism, effectively isolating and reducing the transmission of rotational vibration to the handheld part of the electric brush handle.

Vibration damping design structure, high comfort. By providing a stepped flexible damping sleeve on the outside of the plunger sleeve, targeted zonal attenuation of transmission system vibration is achieved, reducing vibration and noise transmitted to the handle, and improving grip comfort and stability during prolonged use.

Simplified structure, convenient assembly/disassembly, and low cost. Both the connection between the crankshaft and the rotating motor, and the connection between the connecting rod and the plunger rod, adopt cantilever connections, combined with the half-box open transmission cavity structure. This ensures transmission precision while significantly reducing the manufacturing cost of the crankshaft and transmission cavity, and facilitates assembly and maintenance.

BRIEF DESCRIPTION OF THE DRAWINGS

In order to explain the technical solutions in the embodiments of the present disclosure or the related art more clearly, the accompanying drawings required for describing the embodiments or the related art will be briefly introduced below. Obviously, the accompanying drawings in the following description are only some embodiments of the present disclosure. For those skilled in the art, other drawings may be obtained based on these drawings without creative effort.

REFERENCE NUMERALS

Figure 1:
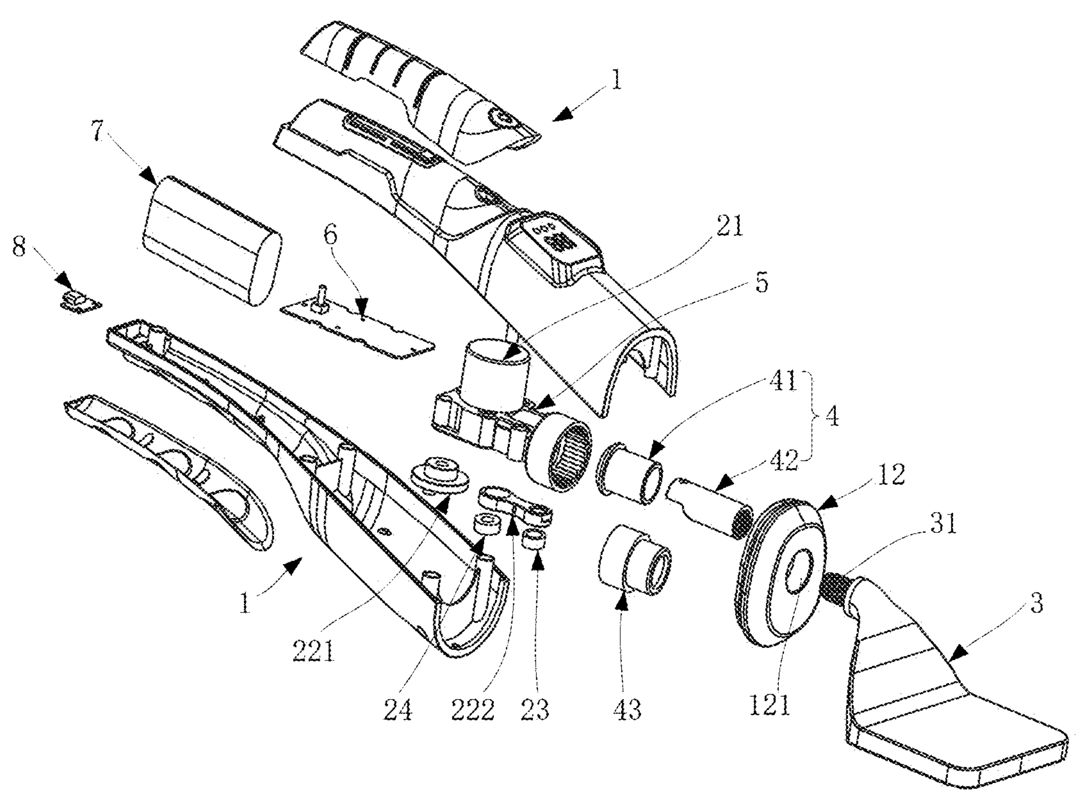
FIG. 1 is an exploded structural schematic view of a vertical reciprocating electric brush for powerful stain removal according to some embodiments of the present disclosure.

Electric brush handle 1, Front end cover 12, Plunger front hole 121, End cover annular step 123, Linear drive mechanism 2, Rotating motor 21, Crank-connecting rod mechanism 22, Crankshaft 221, Center wheel 2211, Central shaft hole 2212, Locking screw hole 2213, Inertia wheel 2214, Eccentric shaft 2215, Connecting rod 222, Rear step 2221, Front step 2222, Front rolling bearing 23, Rear rolling bearing 24, Powerful brush head 3, Tail rod 31, Scrubbing surface 32, Linear sliding pair 4, Linear slide rail 41, Annular flange 411, Linear slider 42, Connecting rod mounting surface 421, Screw pin shaft 422, Internal thread 423, Flexible damping sleeve 43, Front damping segment 431, Rear damping segment 432, Annular groove 433, Annular lip 434, Drive bracket 5, Plunger mounting seat 51, Bottom wall 511, Plunger rear hole 512, Axial rib 513, Motor mounting seat 52, Back surface 521, Side wall 522, Shaft hole 523, Transmission cavity 53, Control circuit 6, Power supply battery 7, Charging interface 8.

DETAILED DESCRIPTION

The technical solutions in the embodiments of the present disclosure will be described clearly and completely below with reference to the accompanying drawings in the embodiments of the present disclosure. Obviously, the described embodiments are only a part of the embodiments of the present disclosure, not all of them. Based on the embodiments of the present disclosure, all other embodiments obtained by those skilled in the art without creative effort shall fall within the scope of the present disclosure.

Figure 2:
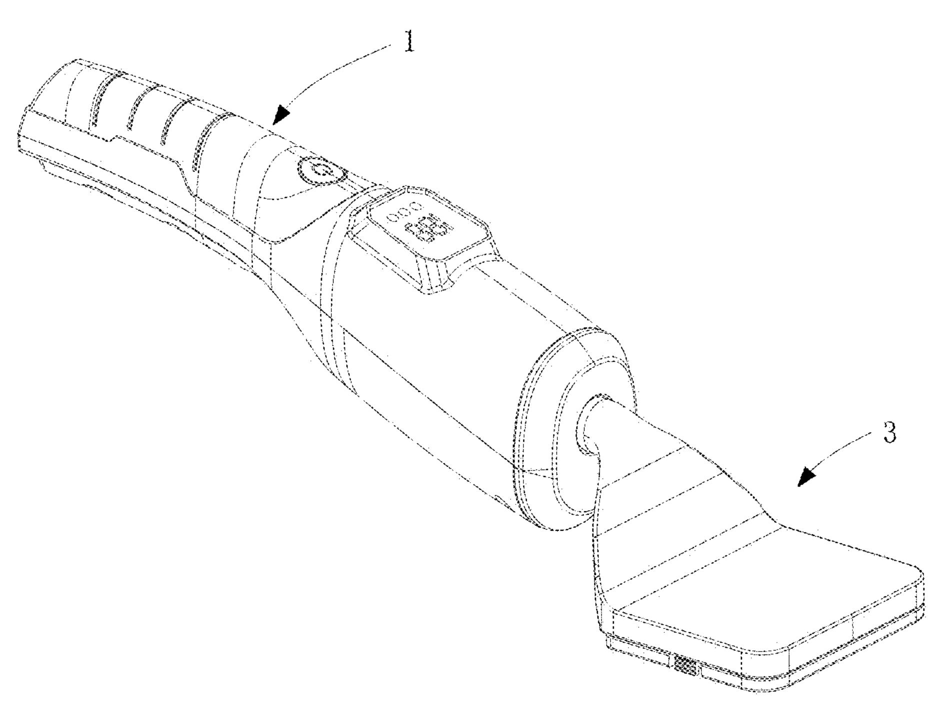
FIG. 2 is an overall structural schematic view of the vertical reciprocating electric brush for powerful stain removal according to some embodiments of the present disclosure.
Figures 3, 4:
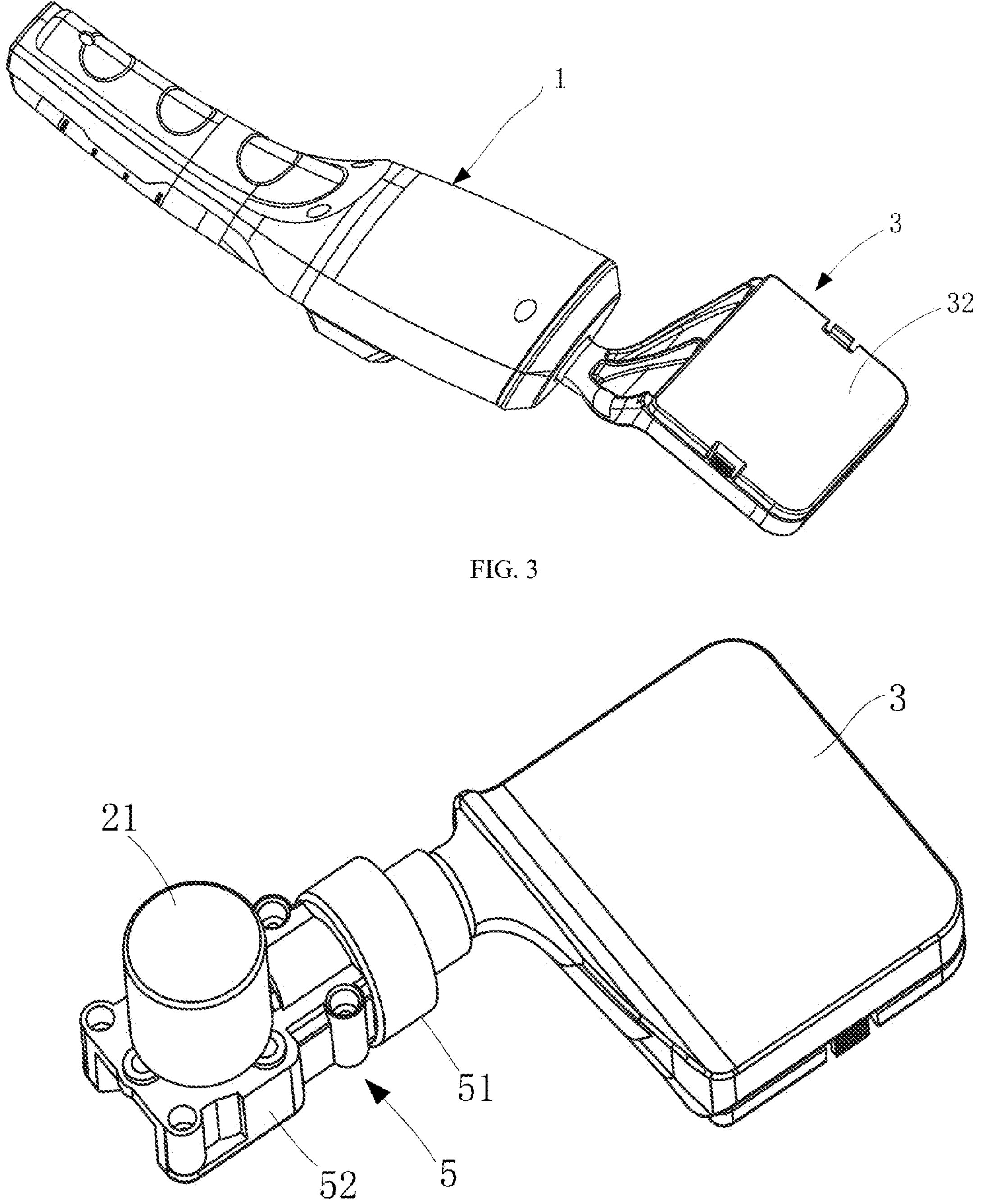
FIG. 3 is another perspective view of the overall structure of the vertical reciprocating electric brush for powerful stain removal according to some embodiments of the present disclosure.
FIG. 4 is a structural schematic view of a drive system of the vertical reciprocating electric brush for powerful stain removal according to some embodiments of the present disclosure.
Figure 5:
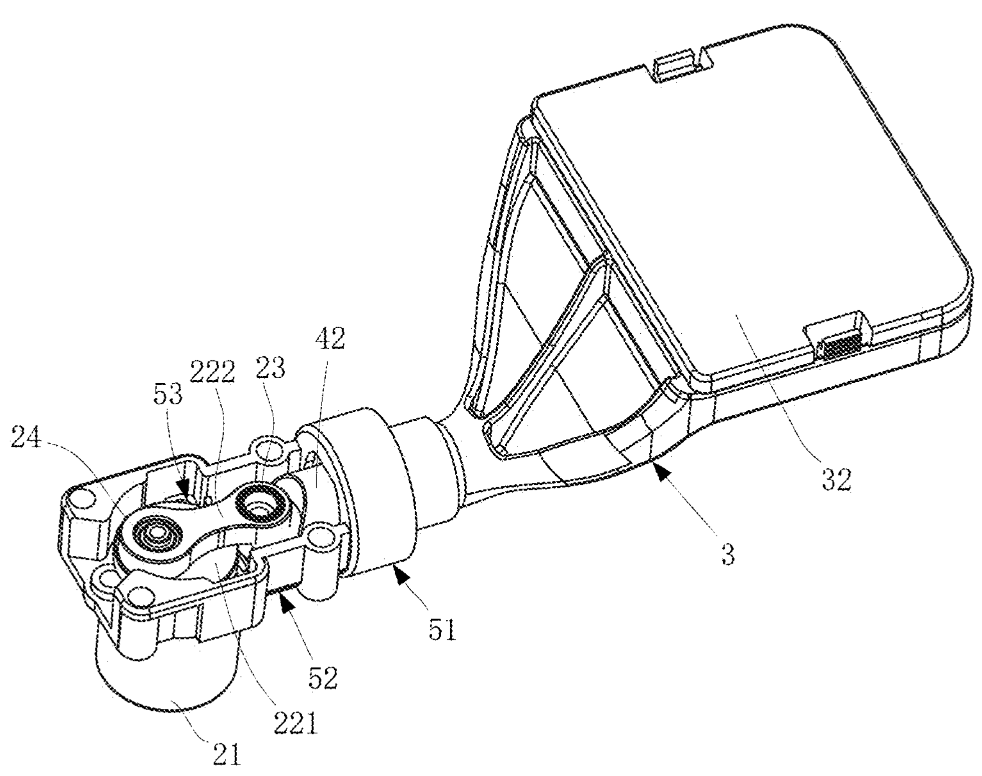
FIG. 5 is another perspective structural view of the drive system of the vertical reciprocating electric brush for powerful stain removal according to some embodiments of the present disclosure.
Figure 6:
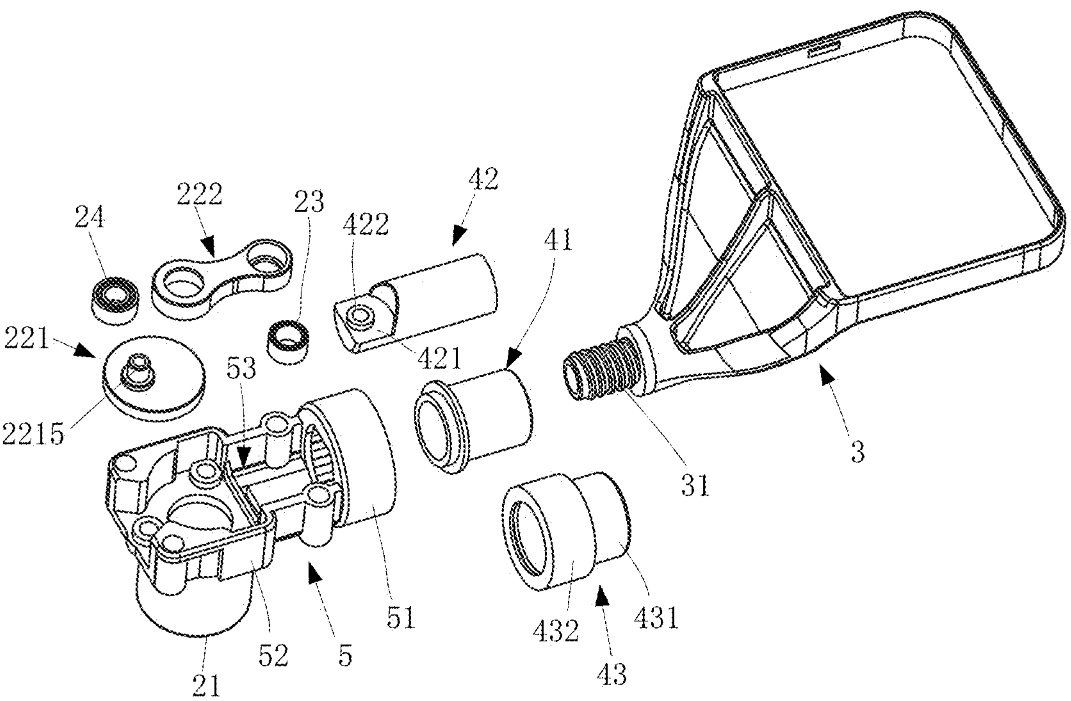
FIG. 6 is an exploded structural view of the drive system of the vertical reciprocating electric brush for powerful stain removal according to some embodiments of the present disclosure.

Referring to FIG. 1, FIG. 2, and FIG. 3, a vertical reciprocating electric brush for powerful stain removal in some embodiments of the present disclosure mainly includes: an electric brush handle 1, a linear drive mechanism 2, a powerful brush head 3, a linear sliding pair 4, and a drive bracket 5.

As shown in FIG. 1, the electric brush handle 1 constitutes an outer shell of the electric brush device, and its interior accommodates the entire drive system. Driven by the linear drive mechanism 2, the powerful brush head 3 arranged on a front side of the electric brush handle 1 can perform high-frequency vertical reciprocating motion. The linear sliding pair 4 is arranged between the linear drive mechanism 2 and the powerful brush head 3, acting as a bridge, responsible for accurately and reliably transmitting the reciprocating linear motion output by the linear drive mechanism 2 to the powerful brush head 3. During use, a user may apply appropriate pressure on the electric brush handle 1, pressing the powerful brush head 3 against a surface of an object to be cleaned, thereby forming an efficient vertical reciprocating scrubbing motion, particularly suitable for removing stubborn stains.

As shown in FIG. 1, FIG. 4, FIG. 5, FIG. 6, FIG. 7, and FIG. 8, the linear sliding pair 4 includes a linear slide rail 41 and a linear slider 42. The linear slide rail 41 is fixed to a front part of the electric brush handle 1, and a linear direction of the linear slide rail 41 is parallel to a connection axis between the powerful brush head 3 and the electric brush handle 1, serving as a guiding base; a front end of the linear slider 42 is connected to a tail of the powerful brush head 3, and a rear end of the linear slider 42 is connected to an output end of the linear drive mechanism 2, thereby performing linear reciprocating motion along the linear slide rail 41.

As shown in FIG. 4, FIG. 5, FIG. 6, FIG. 7, FIG. 8, FIG. 9, FIG. 10, and FIG. 11, the linear drive mechanism 2 is the core that generates reciprocating motion, including a rotating motor 21 and a crank-connecting rod mechanism 22. The rotating motor 21 is fixed inside a housing of the electric brush handle 1, providing mechanical energy to the entire system. A rotation axis of the rotating motor 21 is perpendicular to a sliding direction of the linear sliding pair 4 (i.e., the motion direction of the linear slider 42), and the rotational torque of the rotating motor 21 is output to the powerful brush head 3 through the push-pull force of the linear slider 42.

The crank-connecting rod mechanism 22 is connected between the rotating motor 21 and the linear slider 42 of the linear sliding pair 4, for converting the rotational motion of the rotating motor 21 into linear motion of the linear slider 42. Specifically, the crank-connecting rod mechanism 22 includes: a crankshaft 221 and a connecting rod 222. The crankshaft 221 is arranged on a rotating shaft of the rotating motor 21, its function being to convert the in-situ rotational motion of the rotating shaft of the rotating motor 21 into eccentric rotation. A large end of the connecting rod 222 is connected to an eccentric shaft 2215 of the crankshaft 221, and a small end of the connecting rod 222 is connected to a tail of the linear slider 42. When the crankshaft 221 performs eccentric rotation, through the transmission of the connecting rod 222, the linear slider 42 is driven to slide back and forth relative to the linear slide rail 41, thereby converting the eccentric rotation into the required reciprocating linear motion.

As shown in FIG. 1, FIG. 4 to FIG. 14, and FIG. 19 and FIG. 20, in some embodiments, the linear sliding pair 4 is a plunger sliding pair. The linear slide rail 41 is specifically a plunger sleeve arranged on the front part of the electric brush handle 1, and the linear slider 42 is a plunger rod slidingly fitted with the plunger sleeve, where the plunger rod and the plunger sleeve constitute a stable and reliable piston-type sliding pair. The rotation axis of the rotating motor 21 is set to orthogonally intersect an axis of the plunger rod. The sliding stroke of the plunger rod relative to the plunger sleeve is numerically equal to twice the eccentricity (a) of the eccentric shaft 2215 on the crankshaft 221, ensuring the precision and efficiency of motion conversion.

As shown in FIG. 1, FIG. 4, FIG. 5, FIG. 6, FIG. 7, FIG. 8, FIG. 9, FIG. 10, FIG. 11, and FIG. 15 to FIG. 18, the drive bracket 5 is fixedly arranged inside the electric brush handle 1. The plunger sleeve (linear slide rail 41) is arranged in an inner cavity of a plunger mounting seat 51 disposed on a front part of the drive bracket 5, with an opening of the plunger mounting seat 51 facing forward. In addition, a front end face of the rotating motor 21 is arranged on a reference surface of a motor mounting seat 52 disposed on a rear part of the drive bracket 5. Through this design structure, the axis of the plunger mounting seat 51 is ensured to be parallel to the reference surface of the motor mounting seat 52, thereby reliably meeting the requirement that the rotation axis of the drive motor 21 is perpendicular to the sliding direction of the plunger rod.

As shown in FIG. 5 to FIG. 11, the crankshaft 221 may be an integrally machined component, mainly including: a center wheel 2211, an inertia wheel 2214, and an eccentric shaft 2215. The center wheel 2211 defines a central shaft hole 2212 opened along the axis of the center wheel 2211, for fixedly sleeving onto the rotating shaft of the rotating motor 21. To ensure a reliable connection and prevent relative rotation, a locking screw hole 2213 is defined radially on the center wheel 2211, allowing the crankshaft 221 to be locked onto the rotating shaft of the rotating motor 21 with a fastening screw.

The inertia wheel 2214 is coaxially connected to the center wheel 2211 and designed with a greater diameter and mass. The main function of the inertia wheel 2214 is to increase the rotational inertia of the entire crankshaft 221 and the rotating motor 21, thereby stabilizing the speed of the rotating motor 21 when the load changes. This allows the selection of a rotating motor 21 with a lower rated power while ensuring that the powerful brush head 3 can achieve the required maximum output load, helping to optimize energy efficiency, reduce cost, and decrease size.

Figure 19:
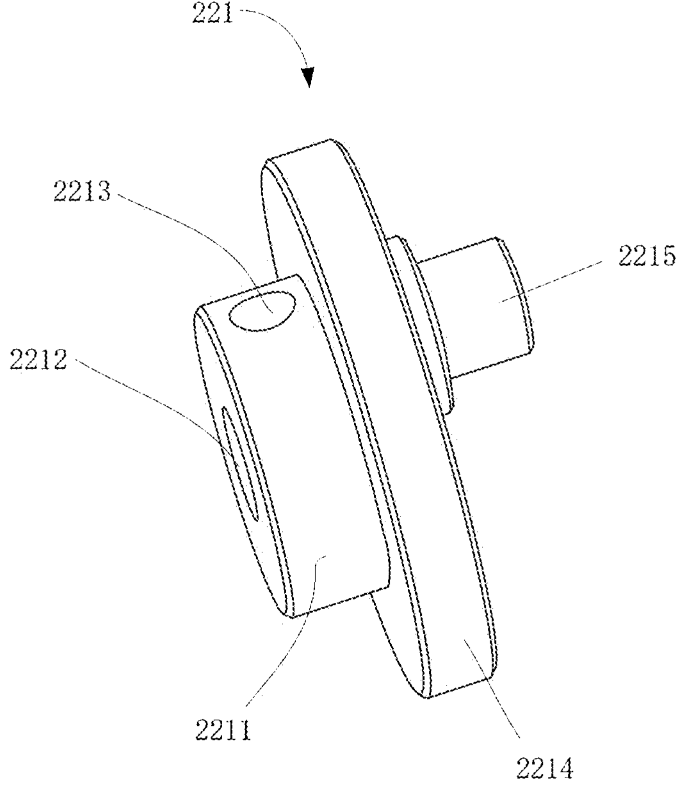
FIG. 19 is a structural schematic view of a crankshaft of the vertical reciprocating electric brush for powerful stain removal according to some embodiments of the present disclosure.
Figure 20:
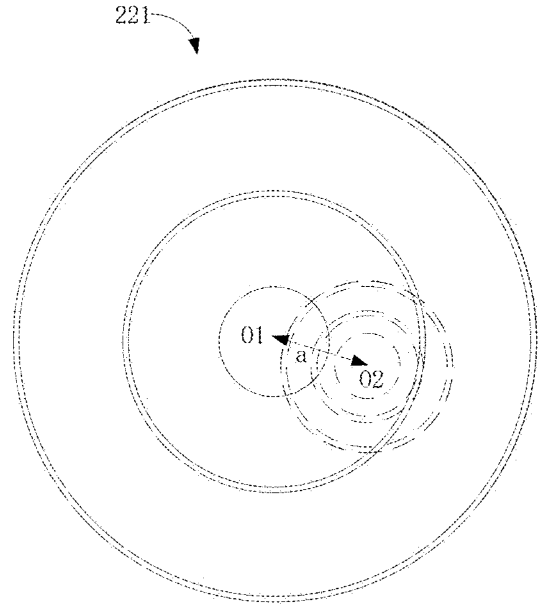
FIG. 20 is another perspective structural view of the crankshaft of the vertical reciprocating electric brush for powerful stain removal according to some embodiments of the present disclosure.
Figure 21:
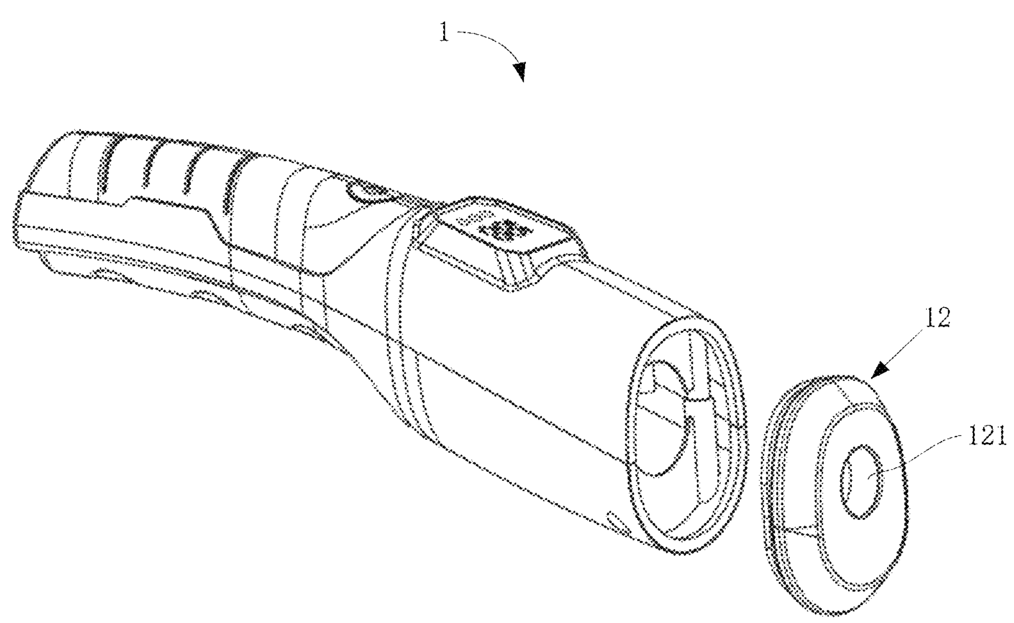
FIG. 21 is a structural schematic view of an electric brush handle of the vertical reciprocating electric brush for powerful stain removal according to some embodiments of the present disclosure.
Figure 22:
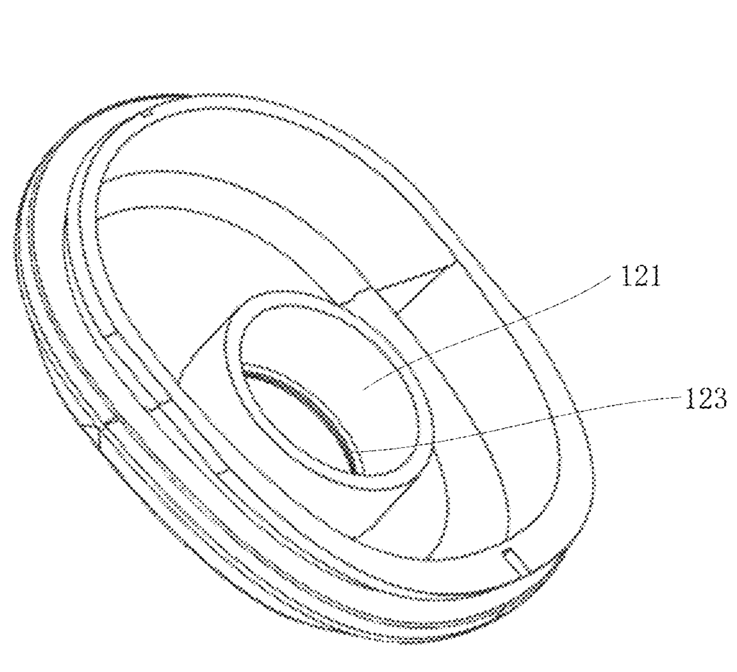
FIG. 22 is a structural schematic view of a front end cover of the electric brush handle of the vertical reciprocating electric brush for powerful stain removal according to some embodiments of the present disclosure.

As shown in FIG. 19 and FIG. 20, the eccentric shaft 2215, of which the axis is parallel to the axis of the inertia wheel 2214 (and thus the center wheel 2211), and has a set eccentricity (distance a between point O1 and point O2). The eccentric shaft 2215 is a key conversion point for power transmission, transmitting the rotational mechanical energy obtained by the central shaft hole 2212 from the rotating shaft of the rotating motor 21 to the connecting rod 222 connected to the eccentric shaft 2215 through eccentric motion, thereby converting rotational motion into the linear reciprocating mechanical energy that drives the brush head to work.

As shown in FIG. 4, FIG. 5, FIG. 6, FIG. 7, FIG. 8, FIG. 9, FIG. 10, and FIG. 11, a tail of the plunger rod (i.e., the linear slider 42) is connected to the small end of the connecting rod 222 via a front rolling bearing 23. The axis of the front rolling bearing 23 is set perpendicular to the axis of the plunger rod. The crankshaft 221 is fixedly sleeved onto the rotating shaft of the rotating motor 21 through the central shaft hole 2212; the eccentric shaft 2215 of the crankshaft 221 is connected to the large end of the connecting rod 222 via a rear rolling bearing 24. A rotation axis of the front rolling bearing 23 and a rotation axis of the rear rolling bearing 24 are parallel to each other, ensuring that the crank-connecting rod mechanism 22 can operate smoothly and with low resistance.

As shown in FIG. 5, FIG. 6, FIG. 9, FIG. 10, FIG. 11, and FIG. 15 to FIG. 18, a back surface 521 and a side wall 522 extending backward of the motor mounting seat 52, and a bottom wall 511 of the plunger mounting seat 51 together enclose to define a transmission cavity 53 for accommodating the crank-connecting rod mechanism 22. The tail of the plunger rod passes through a plunger rear hole 512 on the bottom wall 511 of the plunger mounting seat 51 and extends into the transmission cavity 53. In addition, the rotating shaft of the rotating motor 21 passes through a shaft hole 523 of the motor mounting seat 52 and enters the transmission cavity 53. The two are respectively connected to the crank-connecting rod mechanism 22 within the transmission cavity 53. The transmission cavity 53 adopts a structurally simplified half-box open configuration, and the connection between the crankshaft 221 and the rotating motor 21 uses a cantilever structure. This design may effectively reduce the manufacturing cost of the crankshaft and related components of the transmission cavity.

As shown in FIG. 5, FIG. 6, FIG. 9, FIG. 10, and FIG. 11, a connection between the connecting rod 222 and the plunger rod is also a cantilever structure. Specifically, a connecting rod mounting surface 421 parallel to the sliding direction of the plunger rod is arranged on the tail of the plunger rod. A screw pin shaft 422 perpendicular to the sliding direction of the plunger rod is arranged on the connecting rod mounting surface 421, and the axis of the screw pin shaft 422 intersects the axis of the plunger rod.

As shown in FIG. 4 to FIG. 11, in an assembled state, the large end of the connecting rod 222 is mounted on the eccentric shaft 2215 of the crankshaft 221 via the rear rolling bearing 24 and a corresponding bolt pin; the small end of the connecting rod 222 is mounted on the screw pin shaft 422 on the tail of the plunger rod via the front rolling bearing 23 and a corresponding bolt pin. To precisely axially position the bearings, a rear step 2221 is provided inside a rear bearing hole on the large end of the connecting rod 222, for constraining an outer ring of the rear rolling bearing 24; a front step 2222 is provided inside a front bearing hole on the small end of the connecting rod 222, for constraining an outer ring of the front rolling bearing 23. The axial position of the rolling bearings defined by the front and rear steps, together with the axial dimension of the crankshaft 221 on the rotating motor 21, are designed to precisely accommodate the distance requirement between the connecting rod mounting surface 421 of the plunger rod and the reference surface of the motor mounting seat 52, thereby ensuring the alignment precision and operational stability of the entire transmission system.

As shown in FIG. 1, FIG. 6, FIG. 7, FIG. 8, and FIG. 12 to FIG. 16, a flexible damping sleeve 43 is sleeved on the outside of the plunger sleeve. The outer diameter of the flexible damping sleeve 43 is designed as a stepped structure with a thicker rear segment and a thinner front segment. Specifically, the flexible damping sleeve 43 is divided axially into a front damping segment 431 and a rear damping segment 432 according to different installation positions and damping requirements. The rear damping segment 432 has a larger wall thickness, possessing higher stiffness and damping. Its main function is to attenuate vibration transmitted from the plunger sliding pair to the rigid mounting base (i.e., the plunger mounting seat 51 of the drive bracket 5). The front damping segment 431 is relatively thinner and more flexible, effectively isolating and absorbing micro-vibrations and local impacts between the front end of the plunger sliding pair and a front end cover 12 of the electric brush handle 1 caused by assembly clearance or changes in brush head load. This stepped differential damping design may achieve targeted attenuation of vibrations from different sources and frequencies in the transmission system, thereby overall reducing vibration and noise transmitted to a handheld part of the brush handle shell.

Figures 11, 12:
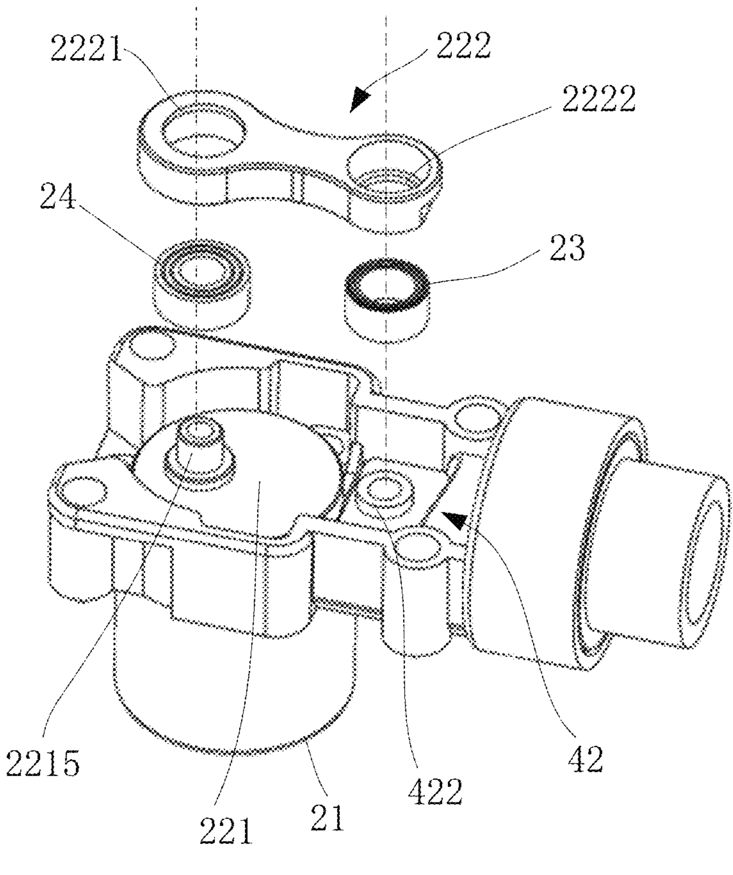
FIG. 11 is an exploded schematic view of the linear drive mechanism of the vertical reciprocating electric brush for powerful stain removal according to some embodiments of the present disclosure.
FIG. 12 is an exploded structural view of a linear sliding pair, a flexible damping sleeve, and a powerful brush head of the vertical reciprocating electric brush for powerful stain removal according to some embodiments of the present disclosure.
Figure 13:
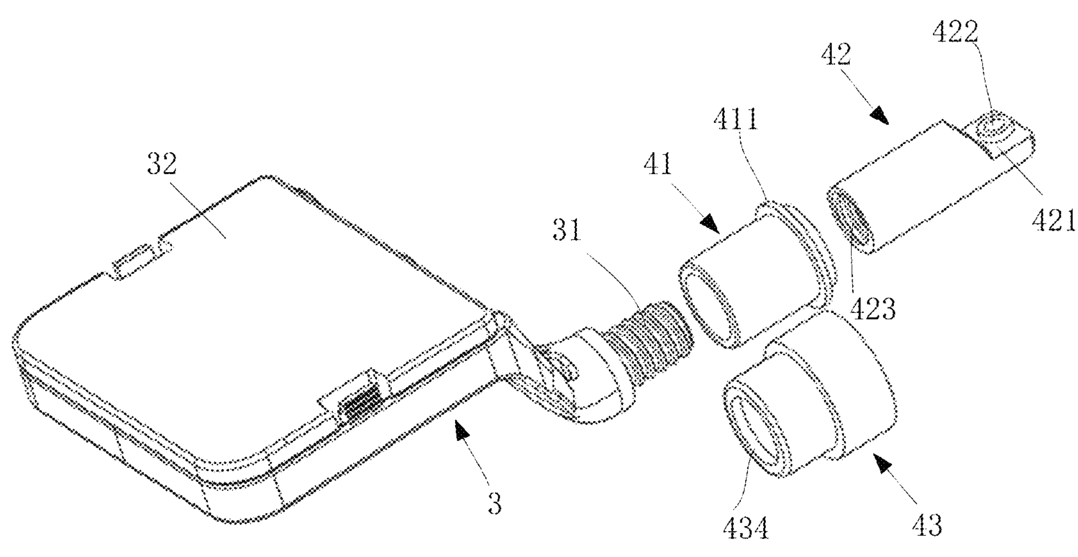
FIG. 13 is another perspective exploded structural view of the linear sliding pair, the flexible damping sleeve, and the powerful brush head of the vertical reciprocating electric brush for powerful stain removal according to some embodiments of the present disclosure.
Figure 14:
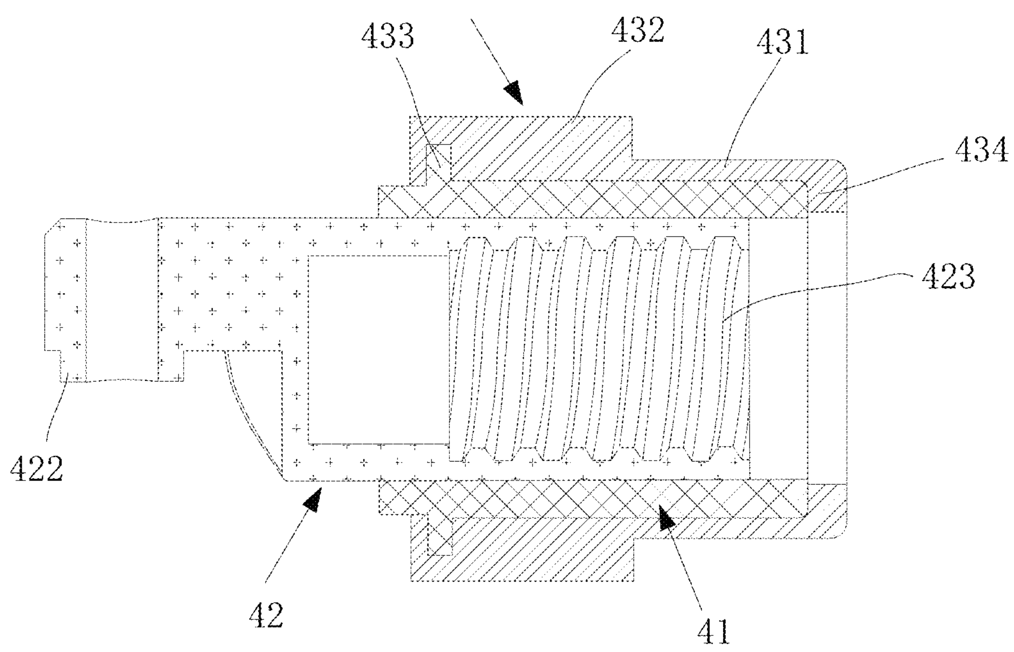
FIG. 14 is a cross-sectional view of the linear sliding pair and the flexible damping sleeve of the vertical reciprocating electric brush for powerful stain removal according to some embodiments of the present disclosure.
Figure 15:
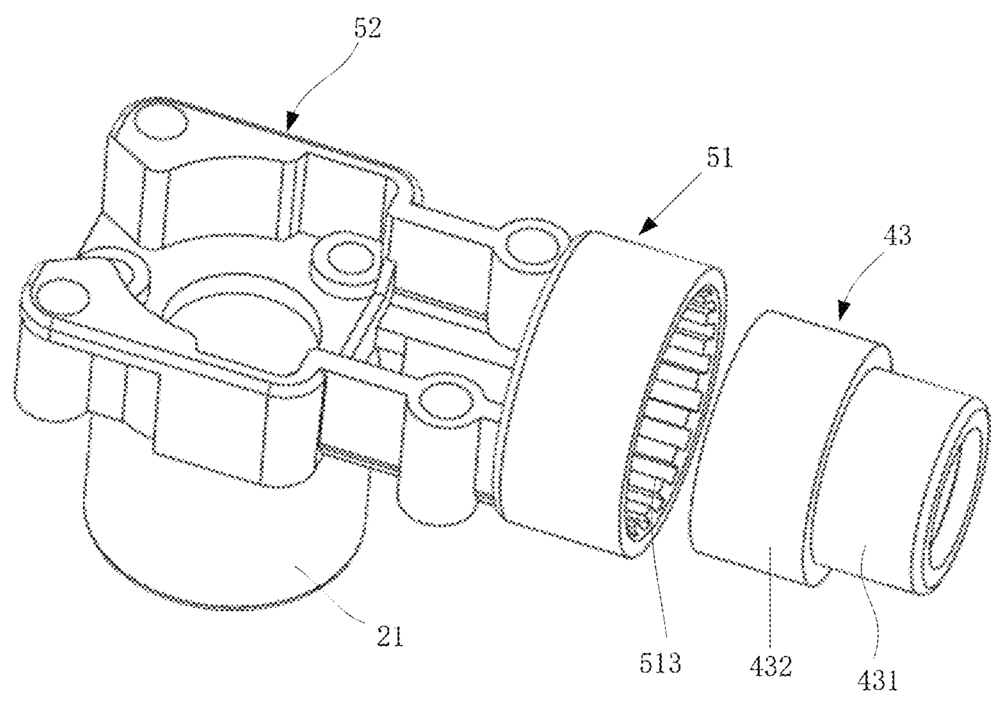
FIG. 15 is an exploded structural view of a drive bracket and the flexible damping sleeve of the vertical reciprocating electric brush for powerful stain removal according to some embodiments of the present disclosure.
Figure 16:
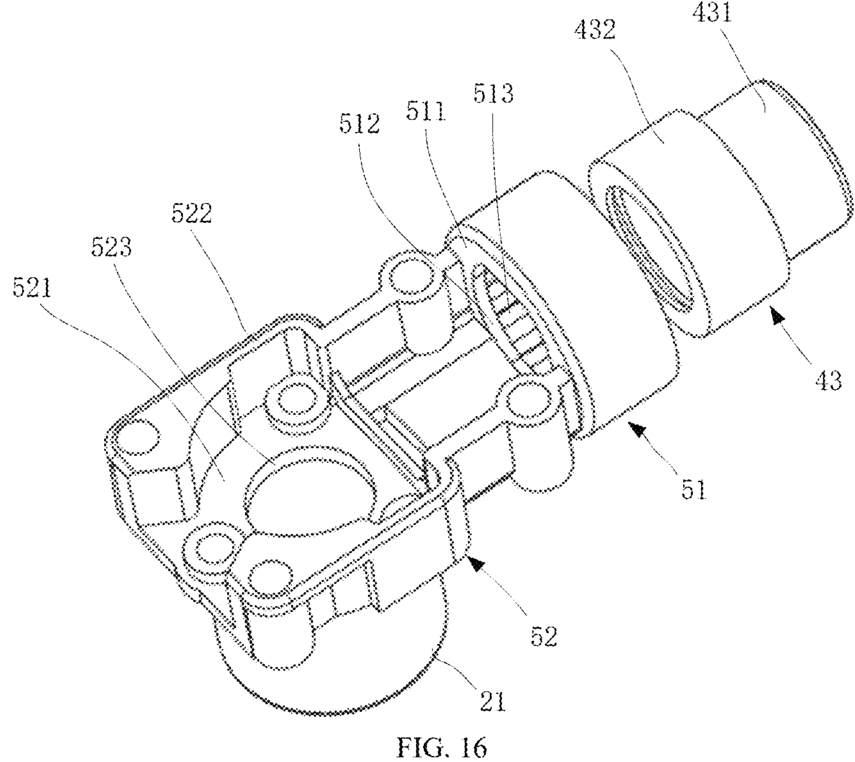
FIG. 16 is another perspective structural view of the drive bracket and the flexible damping sleeve of the vertical reciprocating electric brush for powerful stain removal according to some embodiments of the present disclosure.
Figure 17:
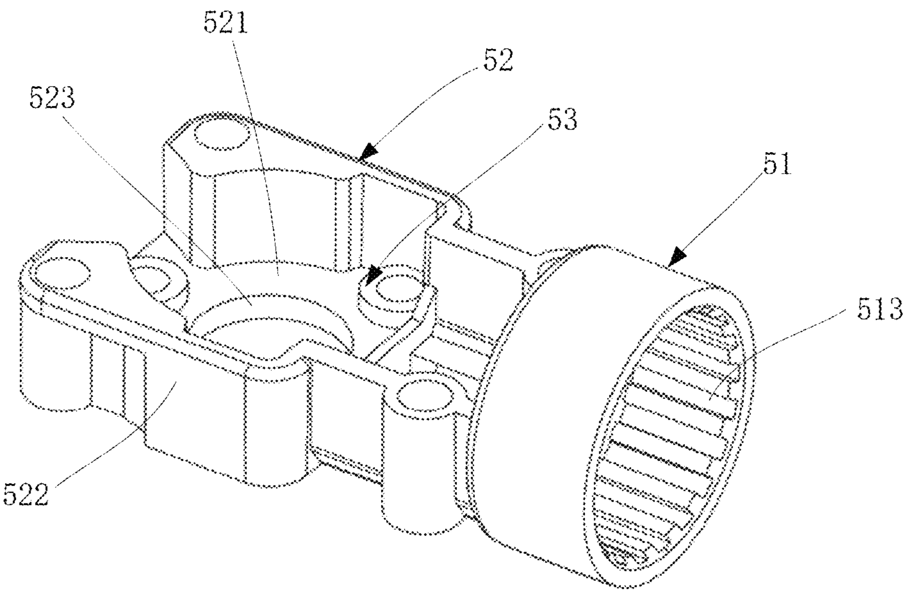
FIG. 17 is a structural schematic view of the drive bracket of the vertical reciprocating electric brush for powerful stain removal according to some embodiments of the present disclosure.
Figure 18:
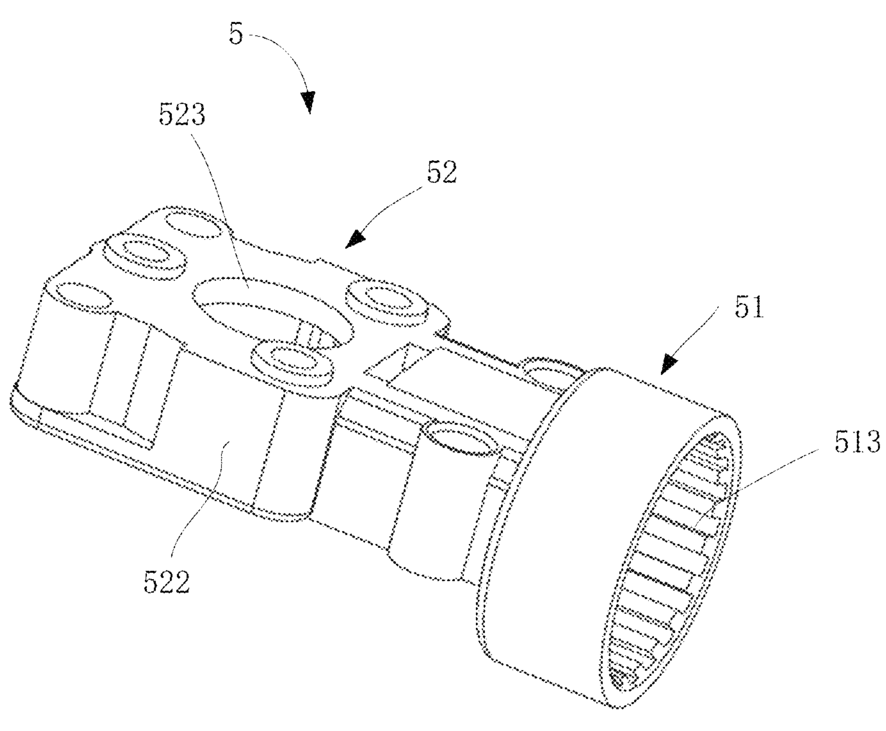
FIG. 18 is another perspective structural view of the drive bracket of the vertical reciprocating electric brush for powerful stain removal according to some embodiments of the present disclosure.

To achieve reliable axial fixation between the flexible damping sleeve 43 and the plunger sleeve, preventing relative movement during use, in some embodiments, the connection structure between the flexible damping sleeve 43 and the plunger sleeve is further designed. Specifically, as shown in FIG. 12, FIG. 13, and FIG. 14, a radially outward extending annular flange 411 is arranged on an outer surface of the plunger sleeve near the rear end of the plunger sleeve (i.e., the end near the drive mechanism). Correspondingly, an annular groove 433 matching the shape of the annular flange 411 is defined on an inner wall of the rear damping segment 432 of the flexible damping sleeve 43. Furthermore, an inwardly extending annular lip 434 is arranged on an open end of the front damping segment 431 of the flexible damping sleeve 43. An inner surface of the annular lip 434 is configured to abut against a front end face of the plunger sleeve, which may attenuate axial vibration between the plunger sliding pair and the front end cover 12.

During assembly, the flexible damping sleeve 43 is sleeved axially onto the outside of the plunger sleeve. When sleeved into place, the annular flange 411 on the plunger sleeve engages and locks into the annular groove 433 on the inner wall of the flexible damping sleeve 43. Simultaneously, the front end face of the plunger sleeve abuts against the inner surface of the annular lip 434. Through this embedded fit of the flange and groove and the axial abutment at the front end face, bidirectional axial limitation of the plunger sleeve and the flexible damping sleeve 43 is jointly achieved, thereby ensuring their stable position during operation without axial play or detachment.

As shown in FIG. 7, FIG. 8, FIG. 15, and FIG. 16, to achieve stable installation of the flexible damping sleeve 43 inside the plunger mounting seat 51 and prevent peripheral rotation, several peripherally spaced axial ribs 513 may be arranged on a circular inner wall of the plunger mounting seat 51. An outer cylindrical surface of the rear damping segment 432 of the flexible damping sleeve 43 forms a tight fit with these axial ribs, thereby reliably positioning and installing the plunger sliding pair inside the plunger mounting seat 51.

As shown in FIG. 1, FIG. 7, FIG. 8, FIG. 21, and FIG. 22, the electric brush handle 1 constitutes the device's outer shell. The front end of the electric brush handle 1 is arranged with the front end cover 12. A front end inner wall of a plunger front hole 121 on the front end cover 12 is arranged with a radially inward extending end cover annular step 123. During assembly, the front damping segment 431 of the flexible damping sleeve 43 passes into the plunger front hole 121, which may reduce vibration transmission between the plunger sliding pair and the front end cover 12. A front end face of the front damping segment 431 of the flexible damping sleeve 43 abuts against a step surface of the end cover annular step 123. In addition, a rear end face of the flexible damping sleeve 43 abuts against an inner surface of the bottom wall 511 of the plunger mounting seat 51. This bidirectional limiting structure not only ensures the stable working position of the flexible damping sleeve 43 in the axial direction, preventing axial play due to reciprocating inertia, but more importantly, allows it to act as an integral unit to undergo controlled elastic compression and rebound in the axial direction. When the plunger sliding pair generates slight axial impact or vibration under working load, the flexible damping sleeve 43, through its axial elastic deformation, may directly absorb and buffer this part of the energy, further attenuating vibration transmitted along the axial direction to the electric handle shell and handheld part.

As shown in FIG. 1, FIG. 7, FIG. 8, FIG. 12, and FIG. 13, a head of the plunger rod passes forward through the plunger sleeve and is connected to a tail rod 31 of the powerful brush head 3, thereby finally transmitting the kinetic energy generated by the linear drive mechanism 2 to the powerful brush head 3. In some embodiments, an internal thread 423 arranged on the head of the plunger rod is screwed onto an external thread arranged on the tail rod 31 of the powerful brush head 3.

Figure 7:
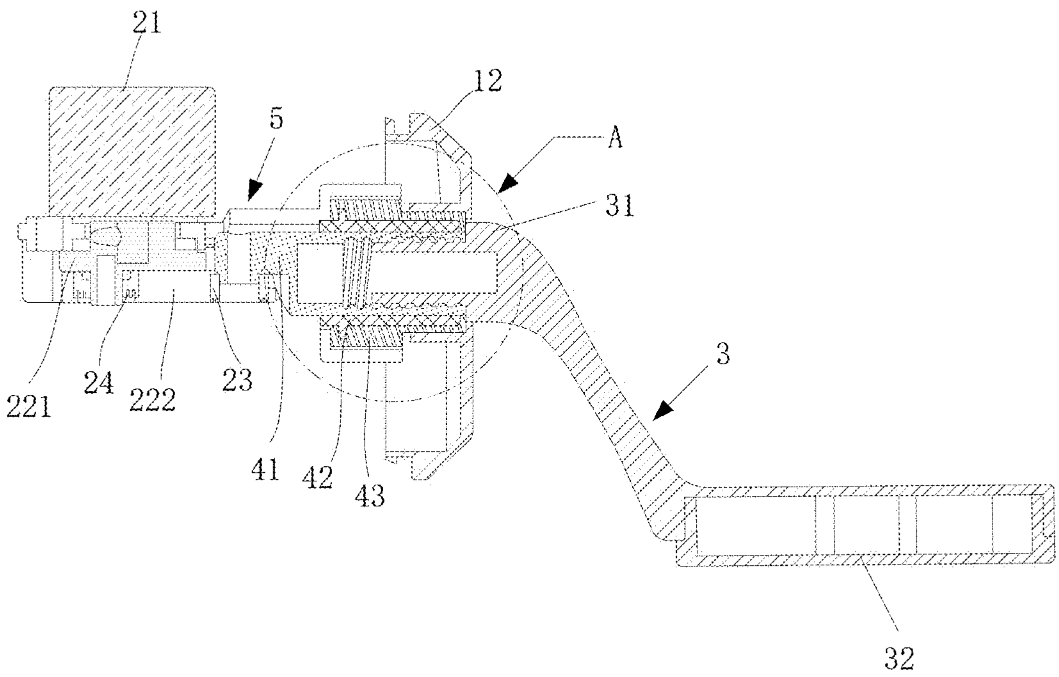
FIG. 7 is a cross-sectional structural view of the drive system of the vertical reciprocating electric brush for powerful stain removal according to some embodiments of the present disclosure.
Figure 8:
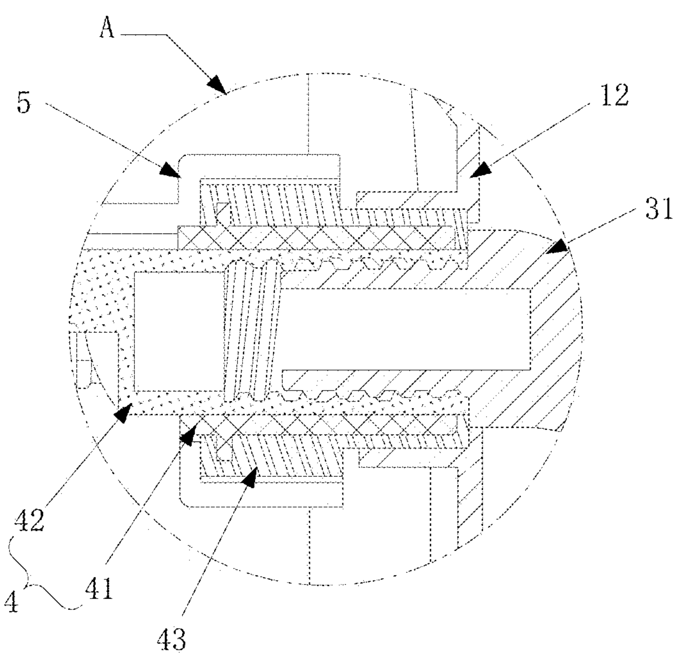
FIG. 8 is an enlarged view of portion A circumscribed in FIG. 7.
Figure 9:
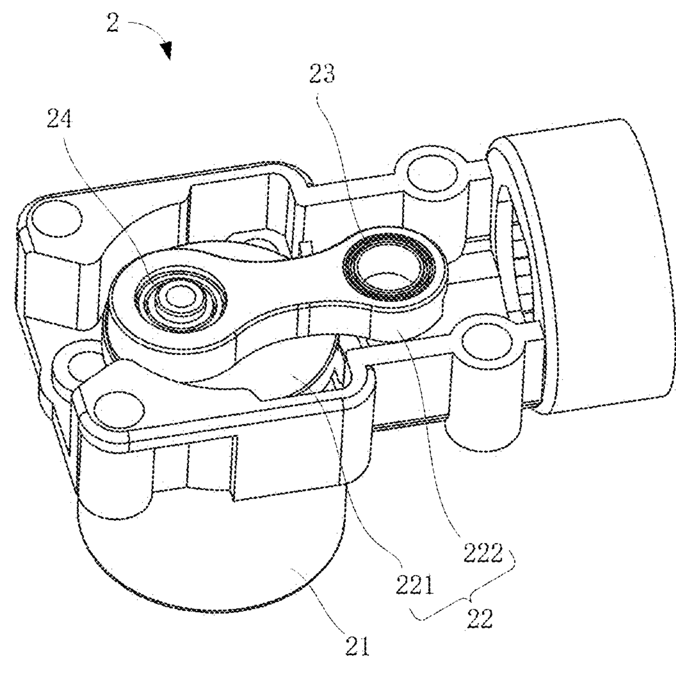
FIG. 9 is a schematic view of a linear drive mechanism of the vertical reciprocating electric brush for powerful stain removal according to some embodiments of the present disclosure.
Figure 10:
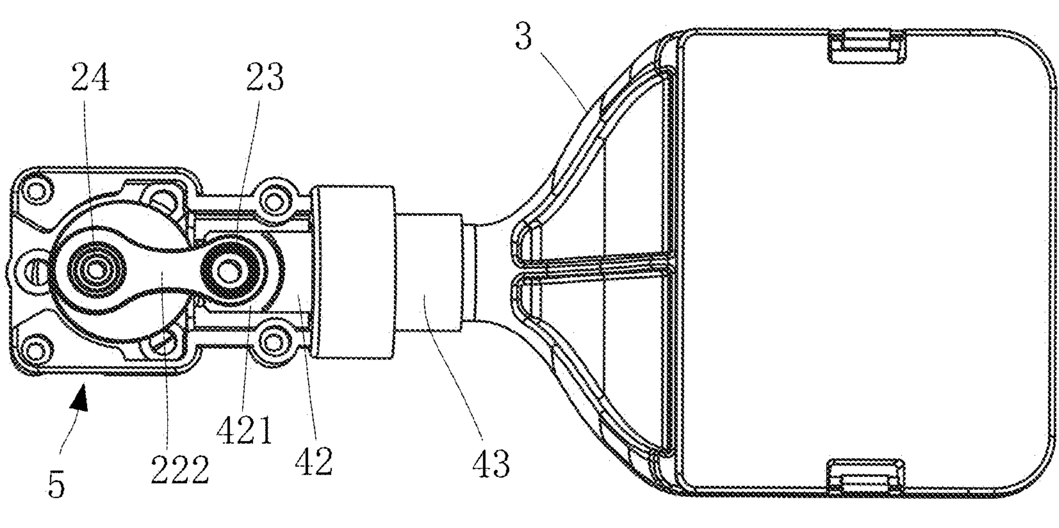
FIG. 10 is a front view of the drive system of the vertical reciprocating electric brush for powerful stain removal according to some embodiments of the present disclosure.

As shown in FIG. 2, FIG. 3, and FIG. 7, a scrubbing surface 32 of the powerful brush head 3 and the tail rod 31 are designed to be substantially parallel, and the tail rod 31 is located above the scrubbing surface 32. This layout enables the scrubbing surface 32 to accurately follow the plunger rod for vertical reciprocating motion within its own plane through the traction of the tail rod 31, thereby ensuring effective and concentrated transmission of cleaning force.

As shown in FIG. 1 to FIG. 22, in some embodiments of the present disclosure, the vertical reciprocating electric brush for powerful stain removal includes an electric brush handle 1, a linear drive mechanism 2 arranged inside the electric brush handle 1, and a powerful brush head 3 arranged on a front side of the electric brush handle 1.

In the embodiments, a motion conversion component arranged between the linear drive mechanism 2 and the powerful brush head 3 may specifically be a plunger sliding pair 4. This plunger sliding pair 4 is responsible for directly and reliably transmitting the linear reciprocating motion output by the linear drive mechanism 2 to the powerful brush head 3.

Furthermore, the electric brush is arranged with a dedicated control circuit 6. The control circuit 6 is integrated inside the electric brush handle 1, configured to supply working power to the linear drive mechanism 2 and control its operating state (such as start, stop, speed adjustment, etc.). In a tail section inside the electric brush handle 1, near the control circuit board 6, a power supply battery 7 is further provided. The battery may be a rechargeable lithium battery pack. To facilitate charging of the power supply battery 7, a charging interface 8 may be specifically arranged on a rear end shell of the tail section of the electric brush handle 1.

When the user operates the control switch and the control circuit 6 drives the linear drive mechanism 2 to work, it can drive the powerful brush head 3 to produce high-frequency longitudinal (front-to-back) reciprocating motion. In this case, pressing the brush head against the surface of the object to be cleaned forms efficient front-to-back reciprocating scrubbing, thereby achieving powerful stain removal.

Specifically, the plunger sliding pair 4 includes a plunger sleeve 41 and a plunger rod 42. The plunger sleeve 41 is fixedly arranged in an inner cavity of a plunger mounting seat 51 arranged on a front part of the electric brush handle 1, serving as a base for guidance and support. The plunger rod 42 forms a precise sliding fit with the plunger sleeve 41. A front end of the plunger rod 42 is connected to the powerful brush head 3, and a rear end of the plunger rod 42 is connected to an output end of the linear drive mechanism 2, thereby performing precise linear reciprocating motion constrained by the plunger sleeve 41.

The linear drive mechanism 2 includes a rotating motor 21 as the power source and a crank-connecting rod mechanism 22 for motion form conversion. The rotating motor 21 is fixedly arranged via a front end face on a reference surface of a motor mounting seat 52 arranged inside a housing of the electric brush handle 1. The crank-connecting rod mechanism 22 is connected between an output shaft of the rotating motor 21 and the plunger rod 42 (as the linear motion output component) of the plunger sliding pair 4.

The working principle may be: the crank-connecting rod mechanism 22 converts the rotational motion output by the rotating motor 21 into linear reciprocating motion of the plunger rod 42. Therefore, the rotational torque generated by the rotating motor 21 is ultimately output in the form of push-pull force through the plunger rod 42, driving the powerful brush head 3 to work. This structure efficiently converts the high-speed rotational motor power into linear reciprocating power suitable for scrubbing work, with a compact structure and reliable transmission.

The above descriptions are only some embodiments of the present disclosure and are not intended to limit the present disclosure. Any modifications, equivalent replacements, improvements, etc., made within the spirit and principles of the present disclosure shall be included within the scope of the present disclosure.

What is claimed is:

1. A vertical reciprocating electric brush for stain removal, comprising:

an electric brush handle (1), wherein a linear drive mechanism (2) is arranged within the electric brush handle (1);

a brush head (3), arranged on a front side of the electric brush handle (1); and a linear sliding pair (4), arranged between the linear drive mechanism (2) and the brush head (3), for transmitting a linear reciprocating motion output by the linear drive mechanism (2) to the brush head (3);

wherein in a state where appropriate pressure is applied on the electric brush handle (1), the brush head (3) acts on an object to be cleaned, forming a vertical reciprocating scrubbing motion;

wherein the linear sliding pair (4) comprises a linear slide rail (41) fixed to a front part of the electric brush handle (1) and a linear slider (42) capable of sliding linearly relative to the linear slide rail (41);

wherein a linear direction of the linear slide rail (41) is parallel to a connection axis between the brush head (3) and the electric brush handle (1), a front end of the linear slider (42) is connected to a tail of the brush head (3), and a rear end of the linear slider (42) is connected to an output end of the linear drive mechanism (2);

wherein the linear drive mechanism (2) comprises a rotating motor (21), wherein the rotating motor (21) is fixed inside a housing of the electric brush handle (1) for providing mechanical energy to the brush head (3);

wherein a rotation axis of the rotating motor (21) is perpendicular to a sliding direction of the linear sliding pair (4), and a rotational torque of the rotating motor (21) is configured to be output to the brush head (3) through a push-pull force of the linear slider (42).

2. The vertical reciprocating electric brush according to claim 1, wherein the linear drive mechanism (2) further comprises:

a crank-connecting rod mechanism (22), connected between a rotating shaft of the rotating motor (21) and the linear slider (42) of the linear sliding pair (4), for converting a rotational motion of the rotating motor (21) into a linear motion of the linear slider (42).

3. The vertical reciprocating electric brush according to claim 2, wherein the crank-connecting rod mechanism (22) comprises:

a crankshaft (221), connected to the rotating motor (21), for converting an in-situ rotation of the rotating motor (21) into an eccentric rotation; and a connecting rod (222), for converting an eccentric rotation of the crankshaft (221) into a reciprocating linear motion of the linear slider (42).

4. The vertical reciprocating electric brush according to claim 3, wherein the linear sliding pair (4) is a plunger sliding pair;

the linear slide rail (41) is a plunger sleeve arranged on the front part of the electric brush handle (1);

the linear slider (42) is a plunger rod slidingly fitted inside the plunger sleeve.

5. The vertical reciprocating electric brush according to claim 4, wherein the rotation axis of the rotating motor (21) orthogonally intersects an axis of the plunger rod;

a sliding stroke of the plunger rod relative to the plunger sleeve equals twice an eccentricity (a) of the crankshaft (221).

6. The vertical reciprocating electric brush according to claim 5, wherein a drive bracket (5) is arranged inside the electric brush handle (1);

a rear segment of the plunger sleeve is arranged in an inner cavity of a plunger mounting seat (51) located on a front part of the drive bracket (5), with an opening of the plunger mounting seat (51) facing forward;

a front end face of the rotating motor (21) is arranged on a reference surface of a motor mounting seat (52) located on a rear part of the drive bracket (5);

wherein an axis of the plunger mounting seat (51) is parallel to the reference surface of the motor mounting seat (52), ensuring that the rotation axis of the drive motor (21) is perpendicular to a sliding direction of the plunger rod.

7. The vertical reciprocating electric brush according to claim 6, wherein a flexible damping sleeve (43) is sleeved on an outside of the plunger sleeve, for reducing vibration transmission between the plunger sliding pair and the electric brush handle (1).

8. The vertical reciprocating electric brush according to claim 7, wherein an outer diameter of the flexible damping sleeve (43) has a stepped structure with a thicker rear segment and a thinner front segment; a rear damping segment (432) of the flexible damping sleeve (43) is configured to attenuate vibration between the plunger sliding pair and the plunger mounting seat (51), and a front damping segment (431) of the flexible damping sleeve (43) is configured to attenuate vibration between the plunger sliding pair and a front end cover (12) of the electric brush handle (1).

9. The vertical reciprocating electric brush according to claim 8, wherein the crankshaft (221) comprises:

a center wheel (2211), defining a central shaft hole (2212) opened along an axis of the center wheel (2211) for sleeving onto the rotating shaft of the rotating motor (21), and a locking screw hole (2213) opened radially for fastening the rotating shaft of the rotating motor (21);

an inertia wheel (2214), coaxial and integrated with the center wheel (2211), for increasing a rotational inertia of the rotating motor (21) to stabilize a speed of the rotating motor (21); wherein the inertia wheel (2214) is capable of reducing a rated power of the rotating motor (21) while ensuring a maximum load of the brush head (3); and an eccentric shaft (2215), extending from a side of the inertia wheel (2214) opposite the center wheel (2211), with an axis of the eccentric shaft (2215) being parallel to an axis of the inertia wheel (2214), for transmitting a rotational mechanical energy from the rotating motor (21) to the connecting rod (222) to convert the rotational mechanical energy into linear reciprocating mechanical energy.

10. The vertical reciprocating electric brush according to claim 9, wherein a tail of the plunger rod is connected to a first end of the connecting rod (222) via a front rolling bearing (23);

an axis of the front rolling bearing (23) is perpendicular to the axis of the plunger rod;

the eccentric shaft (2215) of the crankshaft (221) is connected to a second end of the connecting rod (222) via a rear rolling bearing (24);

the-first end of the connecting rod (222) is smaller than the second end of the connecting rod (222);

a rotation axis of the front rolling bearing (23) and a rotation axis of the rear rolling bearing (24) are precisely parallel, for facilitating reduction of motion resistance of the crank-connecting rod mechanism (22).

11. The vertical reciprocating electric brush according to claim 10, wherein a space enclosed by a back surface (521) of the motor mounting seat (52), a side wall (522), of which an edge extends backward, of the motor mounting seat (52), and a bottom wall (511) of the plunger mounting seat (51) constitutes a transmission cavity (53) for accommodating the crank-connecting rod mechanism (22);

the tail of the plunger rod passes through a plunger rear hole (512) on the bottom wall (511) of the plunger mounting seat (51), and the rotating shaft of the rotating motor (21) passes through a shaft hole (523) of the motor mounting seat (52); the tail of the plunger rod and the rotating shaft of the rotating motor (21) are connected to the crank-connecting rod mechanism (22) respectively within the transmission cavity (53).

12. The vertical reciprocating electric brush according to claim 11, wherein a connection between the crankshaft (221) and the rotating motor (21) is a cantilever structure, and the transmission cavity (53) is a simplified half-box open configuration, for reducing a manufacturing cost of the crankshaft (221) and a crank-connecting rod housing.

13. The vertical reciprocating electric brush according to claim 12, wherein a connection between the connecting rod (222) and the plunger rod is a cantilever structure;

the tail of the plunger rod is arranged with a connecting rod mounting surface (421) parallel to the sliding direction;

the connecting rod mounting surface (421) is arranged with a screw pin shaft (422) perpendicular to the sliding direction;

the screw pin shaft (422) orthogonally intersects the axis of the plunger rod.

14. The vertical reciprocating electric brush according to claim 13, wherein the second end of the connecting rod (222) is arranged on the eccentric shaft (2215) of the crankshaft (221) via the rear rolling bearing (24) and a bolt pin;

the first end of the connecting rod (222) is arranged on the screw pin shaft (422) on the tail of the plunger rod via the front rolling bearing (23) and another bolt pin.

15. The vertical reciprocating electric brush according to claim 14, wherein a rear bearing hole on the second end of the connecting rod (222) is arranged with a rear step (2221) for axially positioning an outer ring of the rear rolling bearing (24);

a front bearing hole on the first end of the connecting rod (222) is arranged with a front step (2222) for axially positioning an outer ring of the front rolling bearing (23);

wherein, axial positions of the front rolling bearing (23) and the rear rolling bearing (24), respectively defined by the front step (2222) and the rear step (2221), and an axial dimension of the crankshaft (221) on the rotating motor (21) are adapted to a distance between the connecting rod mounting surface (421) of the plunger rod and the reference surface of the motor mounting seat (52).

16. A vertical reciprocating electric brush for stain removal, comprising:

an electric brush handle (1), wherein a linear drive mechanism (2) is arranged within the electric brush handle (1);

a brush head (3), arranged on a front side of the electric brush handle (1);

a plunger sliding pair (4), arranged between the linear drive mechanism (2) and the brush head (3), for transmitting a linear reciprocating motion output by the linear drive mechanism (2) to the brush head (3); and a control circuit, for supplying power to and controlling the linear drive mechanism (2);

wherein in a case where the control circuit drives the brush head (3) to move longitudinally via the linear drive mechanism (2), the brush head (3) acts on an object to be cleaned, forming a front-to-back reciprocating scrubbing, wherein the linear sliding pair (4) comprises a linear slide rail (41) fixed to a front part of the electric brush handle (1) and a linear slider (42) capable of sliding linearly relative to the linear slide rail (41);

wherein a linear direction of the linear slide rail (41) is parallel to a connection axis between the brush head (3) and the electric brush handle (1), a front end of the linear slider (42) is connected to a tail of the brush head (3), and a rear end of the linear slider (42) is connected to an output end of the linear drive mechanism (2);

wherein the linear drive mechanism (2) comprises a rotating motor (21), wherein the rotating motor (21) is fixed inside a housing of the electric brush handle (1) for providing mechanical energy to the brush head (3);

wherein a rotation axis of the rotating motor (21) is perpendicular to a sliding direction of the linear sliding pair (4), and a rotational torque of the rotating motor (21) is configured to be output to the brush head (3) through a push-pull force of the linear slider (42).

* * * * *